US010882635B2

(12) United States Patent
Cramblitt (10) Patent No.: US 10,882,635 B2
(45) Date of Patent: Jan. 5, 2021

(54) AIDING MANEUVERING OF OBSCURED OBJECTS (71) Applicant: The Boeing Company, Chicago, IL (US)

(72) Inventor: Robert Merrill Cramblitt, Hazelwood, MO (US)

(73) Assignee: THE BOEING COMPANY, Chicago, IL (US)

(*) Notice: Subject to any disclaimer, the term of this patent is extended or adjusted under 35 U.S.C. 154(b) by 123 days.

(21) Appl. No.: 15/974,931

(22) Filed: May 9, 2018

(65) Prior Publication Data
US 2019/0344902 A1 Nov. 14, 2019

(51) Int. Cl.
B64D 43/00 (2006.01)
G06T 7/73 (2017.01)
G06T 17/20 (2006.01)
H04N 5/445 (2011.01)
B64D 39/02 (2006.01)

(52) U.S. Cl.
CPC ............ *B64D 43/00* (2013.01); *G06T 7/75* (2017.01); *G06T 17/20* (2013.01); *H04N 5/44504* (2013.01); *B64D 39/02* (2013.01); *G06T 2207/30244* (2013.01)

(58) Field of Classification Search
CPC .................. B64D 39/00; B64D 43/00
See application file for complete search history.

(56) References Cited

U.S. PATENT DOCUMENTS

| 5,530,650 A * | 6/1996 | Biferno ............... B64D 39/00 244/135 A |
| 6,752,357 B2 | 6/2004 | Thal et al. |
| 7,298,291 B2 * | 11/2007 | von Thal ............. B64D 39/00 244/135 A |
| 10,388,029 B1 * | 8/2019 | Taylor ............... G06K 9/00214 |

(Continued)

FOREIGN PATENT DOCUMENTS

| AU | 2016 363 838 A1 | 4/2018 |
| EP | 1 747 991 A2 | 1/2007 |
| FR | 2 705 082 A1 | 11/1994 |

OTHER PUBLICATIONS

Extended European Search Report Application No. 19173395.5-1010, dated Aug. 30, 2019.

*Primary Examiner* — Myron Wyche
(74) *Attorney, Agent, or Firm* — Womble Bond Dickinson (US) LLP (57) ABSTRACT A system is provided. The system includes a camera on a refueling aircraft to obtain an image of a receiver aircraft having a receptacle for refueling the receiver aircraft. The system also includes a processor on the refueling aircraft to determine an orientation and position of the receiver aircraft relative to the camera, a separation distance and respective positions of a refueling boom of the refueling aircraft and the receptacle. The processor also generates a display of a side perspective view of 3D models of the refueling boom and the receiver aircraft having the receptacle. The display of the side perspective view illustrates a current position of the refueling boom relative to a current position of the receptacle and enables an operator on the refueling aircraft to observe and guide the refueling boom to the receptacle.

17 Claims, 6 Drawing Sheets (56) References Cited

U.S. PATENT DOCUMENTS

| | | | |
|---|---|---|---|
| 2003/0209633 A1* | 11/2003 | Thal | B64D 39/00 |
| | | | 244/135 A |
| 2014/0306063 A1 | 10/2014 | Kusnitz | |
| 2016/0321530 A1 | 11/2016 | Troy et al. | |
| 2017/0116723 A1 | 4/2017 | Aughey | |
| 2017/0328795 A1* | 11/2017 | Alt | G06T 7/248 |

* cited by examiner

AIDING MANEUVERING OF OBSCURED OBJECTS

TECHNOLOGICAL FIELD

The present disclosure relates generally to aiding maneuvering of obscured objects, and in particular, to aiding maneuvering of obscured objects using 3D models of the obscured objects.

BACKGROUND

A direct view of a scene using either human vision or cameras is sometimes impossible because the viewing angle is obscured by intermediate objects or because it is impossible to locate an observer with a clear line-of-sight (LOS) to the scene of interest. Sometimes a human may attempt to spatially manipulate objects that are obscured or cannot be easily viewed. One solution uses synthetic or enhanced-vision systems to artificially enhance scene visibility and information content. However, this solution does not exploit the unconstrained nature of model-based scene generation and is usually limited to simple enhancement of the information content within the imagery from a sensor. Another solution uses vision-guided robotics systems to assist in the manipulation of objects in robotic servo-systems. Similarly, this solution does not exploit the advantage gained through knowledge of 3D models of objects in a scene.

Therefore, it would be desirable to have a system and method that takes into account at least some of the issues discussed above, as well as other possible issues.

BRIEF SUMMARY

Example implementations of the present disclosure are directed to aiding maneuvering of obscured objects. Example implementations can enable an operator to observe obscured objects in a scene in real-time by dynamically generating visualizations using 3D models of objects in the scene. Example implementations can provide operators of actuators, such as a refueling aircraft or a tanker boom, with the ability to visualize interactions in 3D space that may otherwise be impossible to observe. Also, example implementations can provide an indication of collisions that might otherwise be unnoticed. Moreover, example implementations can be used in manufacturing or service for cases in which manipulation of tooling is required but cannot be directly viewed.

The present disclosure thus includes, without limitation, the following example implementations.

Some example implementations provide a system for aiding maneuvering of a refueling boom of a refueling aircraft, the system comprising: a camera on the refueling aircraft configured to obtain an image of a receiver aircraft having a receptacle for refueling the receiver aircraft; and a processor on the refueling aircraft, coupled to the camera and configured to at least: determine, from points on the image of the receiver aircraft, an orientation and position of the receiver aircraft relative to the camera using a pose estimation algorithm and a known relationship between the points on the image of the receiver aircraft and corresponding points on a 3D model of the receiver aircraft; determine, based on the orientation and position of the receiver aircraft, a separation distance and respective positions of the refueling boom of the refueling aircraft and the receptacle of the receiver aircraft; and generate a display on a display device in the refueling aircraft, using the separation distance and respective positions of the refueling boom and the receptacle, the display being of a side perspective view of a 3D model of the refueling boom and the 3D model of the receiver aircraft having the receptacle, illustrating a current position of the refueling boom relative to a current position of the receptacle, from a viewpoint of a virtual camera positioned alongside the refueling boom, wherein the display of the side perspective view illustrating the current position of the refueling boom relative to the current position of the receptacle enables an operator on the refueling aircraft to observe and guide the refueling boom to the receptacle.

In some example implementations of the system of any preceding example implementation, or any combination of preceding example implementations, wherein the processor being configured to generate the display includes being configured to retrieve and orient positions of the 3D model of the refueling boom and the 3D model of the receiver aircraft based on the separation distance and the respective positions of the refueling boom and the receptacle.

In some example implementations of the system of any preceding example implementation, or any combination of preceding example implementations, wherein the processor being configured to generate the display includes being configured to overlay indicia on the side perspective view indicating a point of collision between the refueling boom and the receiver aircraft.

In some example implementations of the system of any preceding example implementation, or any combination of preceding example implementations, the system further comprising a storage device including the 3D model of the refueling boom and the 3D model of the receiver aircraft.

In some example implementations of the system of any preceding example implementation, or any combination of preceding example implementations, wherein the respective positions of the refueling boom of the refueling aircraft include a position of the refueling boom, and the processor being configured to determine the separation distance and the respective positions includes being configured to determine the position of the refueling boom using one or more sensors on the refueling boom.

In some example implementations of the system of any preceding example implementation, or any combination of preceding example implementations, wherein the display of the side perspective view enables the operator on the refueling aircraft to observe and guide a tip of the refueling boom to the receptacle.

Some example implementations provide a method of aiding maneuvering of a refueling boom of a refueling aircraft the method comprising: obtaining, by a camera on the refueling aircraft, an image of a receiver aircraft having a receptacle for refueling the receiver aircraft; and by a processor on the refueling aircraft; determining, from points on the image of the receiver aircraft, an orientation and position of the receiver aircraft relative to the camera using a pose estimation algorithm and a known relationship between the points on the image of the receiver aircraft and corresponding points on a 3D model of the receiver aircraft; determining, based on the orientation and position of the receiver aircraft, a separation distance and respective positions of the refueling boom of the refueling aircraft and the receptacle of the receiver aircraft; and generating a display on a display device in the refueling aircraft, using the separation distance and respective positions of the refueling boom and the receptacle, the display being of a side perspective view of a 3D model of the refueling boom and the 3D model of the receiver aircraft having the receptacle, illustrating a current position of the refueling boom relative to a current position of the receptacle, from a viewpoint of a virtual camera positioned alongside the refueling boom, wherein the display of the side perspective view illustrating the current position of the refueling boom relative to the current position of the receptacle enables an operator on the refueling aircraft to observe and guide the refueling boom to the receptacle.

Some example implementations provide a computer-readable storage medium for aiding maneuvering of a refueling boom of a refueling aircraft, the computer-readable storage medium being non-transitory and having computer-readable program code stored therein that in response to execution by a processor, causes a computer system to at least: obtain an image of a receiver aircraft having a receptacle for refueling the receiver aircraft from a camera on the refueling aircraft; determine, from points on the image of the receiver aircraft, an orientation and position of the receiver aircraft relative to the camera using a pose estimation algorithm and a known relationship between the points on the image of the receiver aircraft and corresponding points on a 3D model of the receiver aircraft; determine, based on the orientation and position of the receiver aircraft, a separation distance and respective positions of the refueling boom of the refueling aircraft and the receptacle of the receiver aircraft; and generate a display on a display device in the refueling aircraft, using the separation distance and respective positions of the refueling boom and the receptacle, the display being of a side perspective view of a 3D model of the refueling boom and the 3D model of the receiver aircraft having the receptacle, illustrating a current position of the refueling boom relative to a current position of the receptacle, from a viewpoint of a virtual camera positioned alongside the refueling boom, wherein the display of the side perspective view illustrating the current position of the refueling boom relative to the current position of the receptacle enables an operator on the refueling aircraft to observe and guide the refueling boom to the receptacle.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to aiding maneuvering of obscured objects, and in particular, to aiding maneuvering of obscured objects using 3D models of the obscured objects.

Figure 1A:
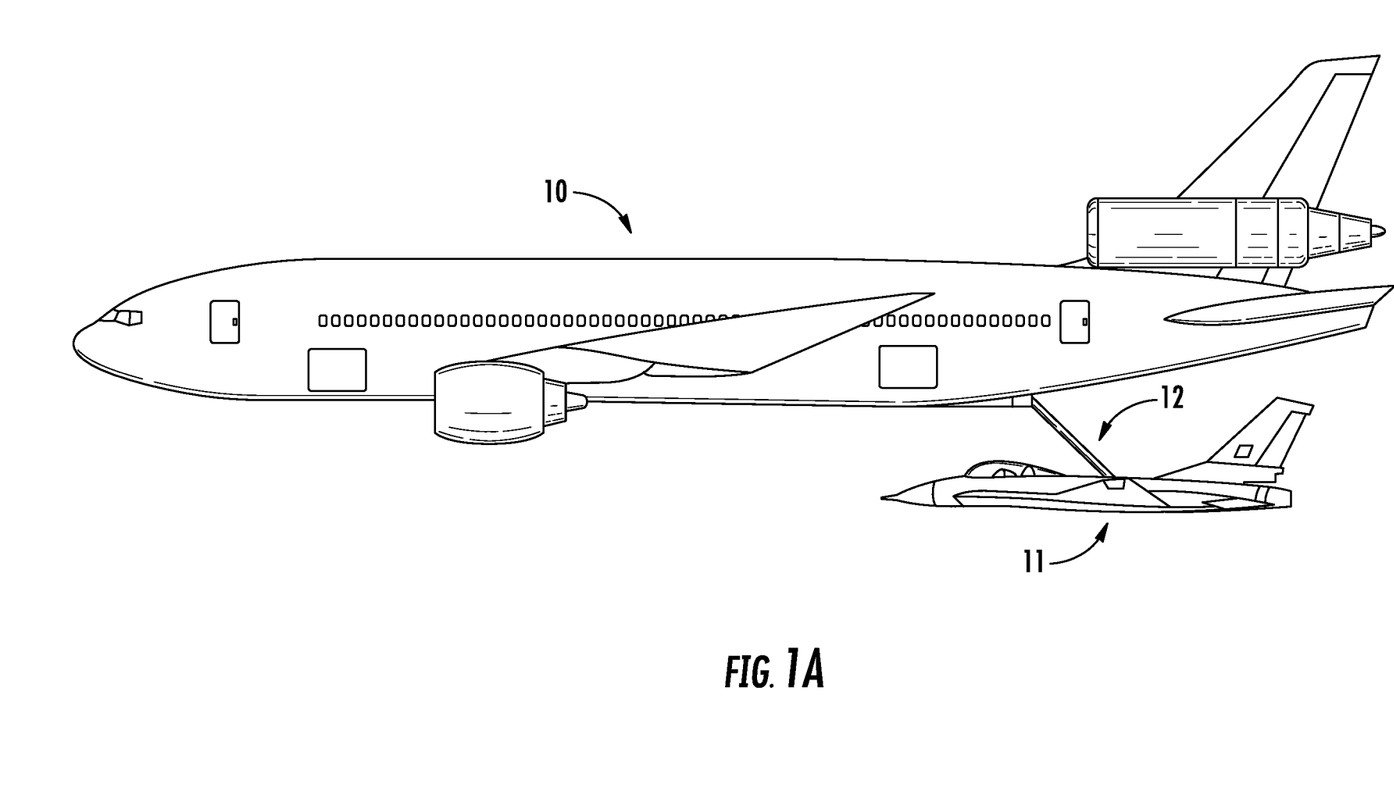
FIG. 1A illustrates an example refueling aircraft and receiving aircraft, utilizing a system according to example implementations of the present disclosure.

FIG. 1A illustrates an example refueling aircraft and receiving aircraft, utilizing a system according to example implementations of the present disclosure. As shown, a refueling aircraft 11 is refueling a receiving aircraft 10 through a refueling boom 12. A system (described in FIG. 1B below) for aiding maneuvering of the refueling boom may be in the refueling aircraft.

Figure 1B:
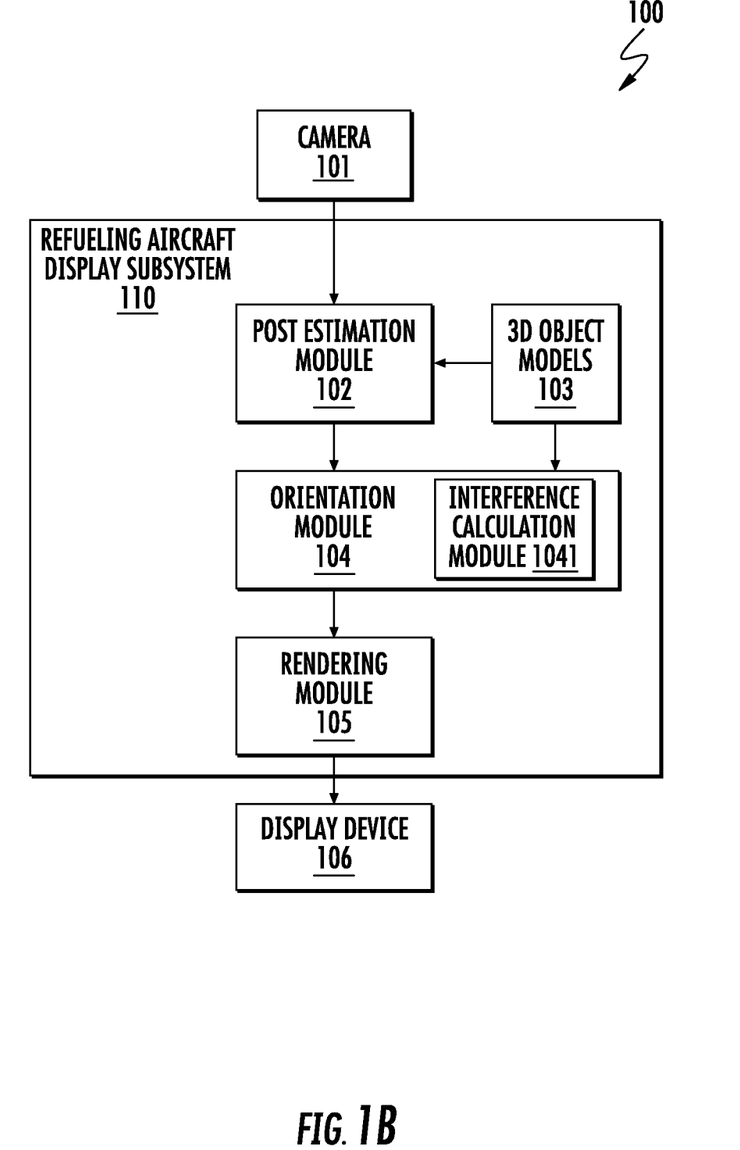
FIG. 1B illustrates a system, according to example implementations of the present disclosure.

FIG. 1B illustrates a system 100 for aiding maneuvering of a refueling boom of a refueling aircraft, according to example implementations of the present disclosure. The system may simply be referred to as the "system" herein.

The system 100 includes any of a number of different subsystems (each an individual system) for performing one or more functions or operations. As shown, in some examples, the system includes one or more of each of a camera 101, a refueling aircraft display subsystem 110 (also referred to as the "subsystem" herein), and a display device 106. As also shown, the refueling aircraft display subsystem may include a pose estimation module 102, 3D object models 103, an orientation module 104, and a rendering module 105. The camera, subsystem and display device may be co-located or directly coupled to one another, or in some examples, they may communicate with one another across one or more computer networks. Further, although shown as part of the system, it should be understood that any one or more of the pose estimation module, 3D object models, orientation module, or rendering module may function or operate as a separate system without regard to any of the other subsystems. It should also be understood that the system may include one or more additional or alternative subsystems than those shown in FIG. 1B.

In some examples, the camera 101 on the refueling aircraft is configured to obtain an image of a receiver aircraft having a receptacle for refueling the receiver aircraft. In one example, the receiver aircraft may be in flight and the refueling aircraft may be also in flight to perform the duty to refuel the receiver aircraft through the refueling boom. The camera may obtain the image by image capture, and the subsystem 110 may obtain the image from the camera.

After obtaining the image form the camera 101, in some examples, the refueling aircraft display subsystem 110 or more particularly its pose estimation module 102 is configured to determine, from points on the image of the receiver aircraft, an orientation and position of the receiver aircraft relative to the camera using a pose estimation algorithm and a known relationship between the points on the image of the receiver aircraft and corresponding points on a 3D model of the receiver aircraft. In one example, the 3D model of the receiver aircraft is stored in the 3D object models 103.

In some examples, based on the orientation and position of the receiver aircraft, the orientation module 104 is configured to determine a separation distance and respective positions of the refueling boom of the refueling aircraft and the receptacle of the receiver aircraft. In some examples, the respective positions of the refueling boom of the refueling aircraft include a position of the refueling boom, and the orientation module is configured to determine the position of the refueling boom using one or more position sensors on the refueling boom. In one example, the orientation module includes an interference calculation module 1041 configured to determine a point of collision between the refueling boom and the receiver aircraft.

In some examples, the rendering module 105 is configured to generate a display on the display device 106 in the refueling aircraft, using the separation distance and respective positions of the refueling boom and the receptacle. The display illustrates a side perspective view of a 3D model of the refueling boom and the 3D model of the receiver aircraft having the receptacle and illustrates a current position of the refueling boom relative to a current position of the receptacle, from a viewpoint of a virtual camera positioned alongside the refueling boom. The display of the side perspective view illustrating the current position of the refueling boom relative to the current position of the receptacle enables an operator on the refueling aircraft to observe and guide the refueling boom to the receptacle.

Figure 6:
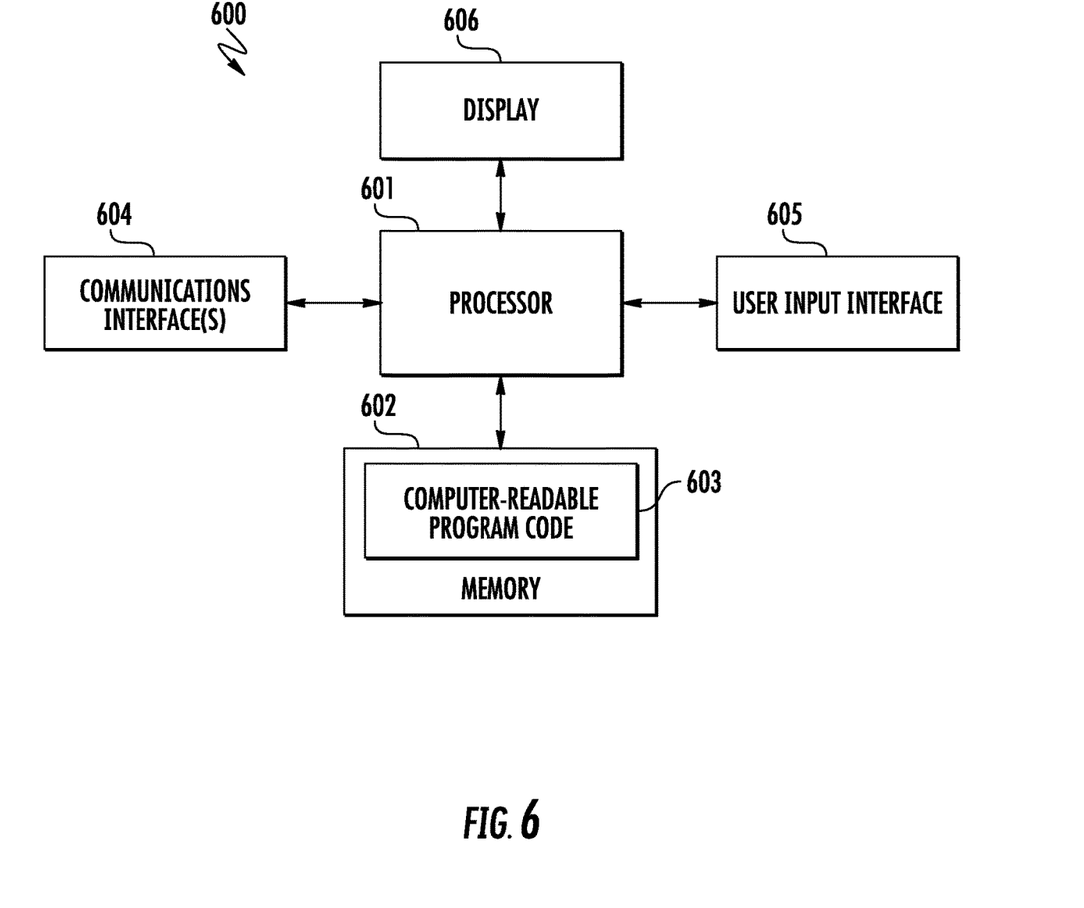
FIG. 6 illustrates an apparatus according to some example implementations.

In some examples, the system 100 further comprises a storage device including the 3D model of the refueling boom and the 3D model of the receiver aircraft. In one example, the storage device can be a memory (as shown in FIG. 6 below) or can be a separate storage device. The storage device can store the 3D object models 103. The pose estimation module 102 and the orientation module 104 can retrieve the 3D model of the refueling boom and the 3D model of the receiver aircraft from the storage device.

To generate the display, in some examples, the rendering module 105 is configured to retrieve and orient positions of the 3D model of the refueling boom and the 3D model of the receiver aircraft based on the separation distance and the respective positions of the refueling boom and the receptacle. In some examples, the rendering module is configured to overlay indicia on the side perspective view indicating a point of collision between the refueling boom and the receiver aircraft.

As explained above, the rendering module 105 can generate the display to enable the operator on the refueling aircraft to observe and guide the refueling boom to the receptacle. In some examples, the display of the side perspective view enables the operator on the refueling aircraft to observe and guide a tip of the refueling boom to the receptacle.

Figure 2:
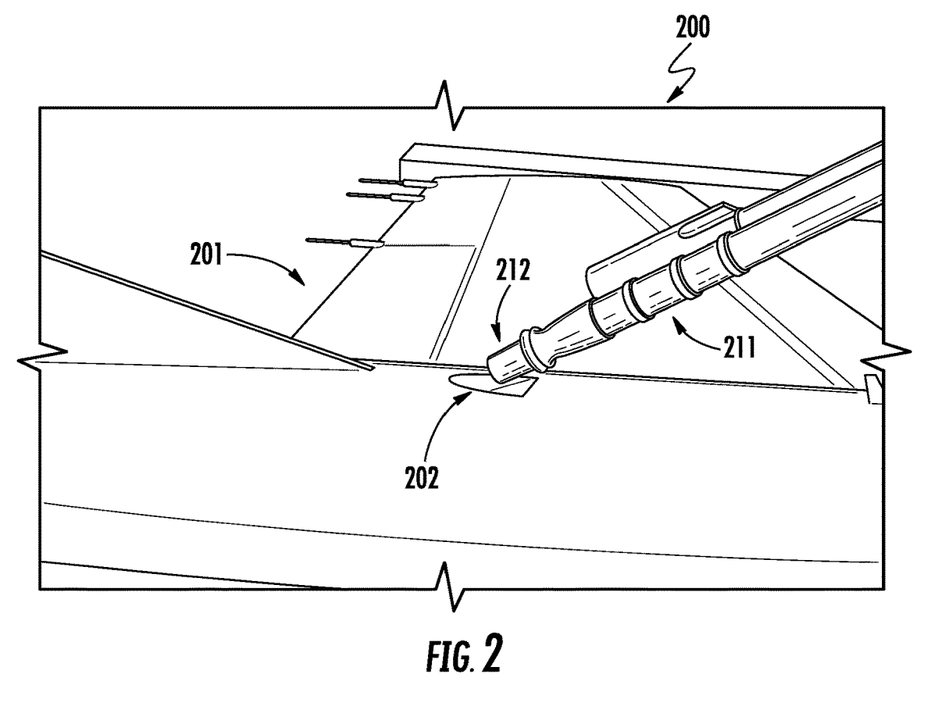
FIG. 2 illustrates a display of a side perspective view of a 3D model of a refueling boom and a 3D model of a receiver aircraft having a receptacle, according to various example implementations.

FIG. 2 illustrates a display 200 of a side perspective view of a 3D model of a refueling boom 211 and a 3D model of a receiver aircraft 201 having a receptacle 202 generated by the rendering module 105 of the system 100, according to various example implementations. FIG. 2 illustrates an example of visualization of the interaction between the refueling boom of a refueling aircraft and the receiver aircraft. In this example, the operator of the refueling aircraft, which may be either a human or an automated system, is attempting to guide the tip 212 of the refueling boom into the receptacle on the receiver aircraft. The refueling boom itself may obscure the tip from the viewpoint of the operator. In another example, the tip may be viewed at a shallow angle. The obscurity or viewpoint at the shallow angle can make alignment between the tip and the receptacle difficult.

In one example, the display 200 in FIG. 2 represents a rendition of a side perspective view from a synthetic viewpoint. The side perspective view includes a scene illustrating a current position of the refueling boom 211 relative to a current position of the receptacle 202. In the scene shown in FIG. 2, all objects in the scene (e.g., the receiver aircraft 201 having the receptacle and the refueling boom having the tip 212) are represented by 3D models. The position of the refueling boom can be inferred from knowledge of commanded articulation positions or be measured by sensors on the refueling boom. In cases where additional forces deflect the refueling boom, image processing can be used to identify specific points on the structure of the refueling boom to refine the estimation of the position of the refueling boom or the tip 212. The receiver aircraft may be an object whose position may not be directly measured by a sensor. Instead, the position of the receiver aircraft may be measured based an image obtained by the camera 101 on the refueling aircraft. For example, the receiver aircraft's orientation in 6D space (i.e., 3D position and 3D orientation), or pose, can be determined using pose-estimation algorithms that operate on measured image coordinates or points in the image. The measured image coordinates or points have corresponding known points on the 3D model of the receiver aircraft.

In one example, the display 200 can be a synthetic image generated by the rendering module 105 and displayed on the display device 106 in the refueling aircraft. The display illustrates a side perspective view of the 3D model of the refueling boom 211 and the 3D model of the receiver aircraft 201 having the receptacle 202. The display of the side perspective view enables an operator on the refueling aircraft to observe and guide the refueling boom to the receptacle. In other words, the side perspective view is generated as if there is a virtual camera positioned alongside the refueling boom and captures the side perspective view. As shown in FIG. 2, the tip 212 of the refueling boom, which may be obscured from the viewpoint of the operator on the refueling aircraft, can be seen in the display (a synthetic image) displayed on the display device in the refueling aircraft.

Figure 3:
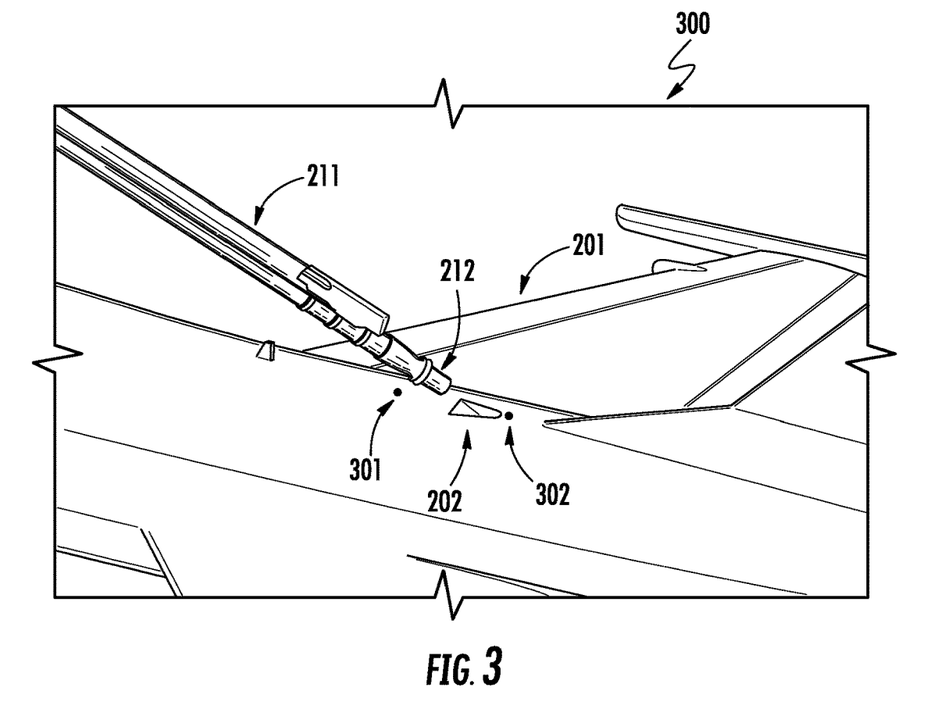
FIG. 3 illustrates a display of a side perspective view indicating points of collision between the refueling boom and the receiver aircraft, according to various example implementations.

FIG. 3 illustrates a display 300 of a side perspective view indicating points of collision between the refueling boom 211 and the receiver aircraft 201 generated by the rendering module 105 of the system 100, according to various example implementations. As explained above, in some examples, the rendering module 105 is configured to overlay indicia on the side perspective view indicating a point of collision between the refueling boom and the receiver aircraft. FIG. 3 shows the display including annotated indicia to indicate collision points 301 and 302. The collision points may indicate actual or potential collisions or contacts (e.g., scratches) between the tip 212 and the receiver aircraft or the receptacle 202. In one example, collisions between the refueling boom and the receiver aircraft may be calculated by the interference calculation module 1041 based on their orientations in 6D space (i.e., 3D position and 3D orientation). The collisions can be displayed to alert the operator that a contact between the refueling boom and the receiver aircraft has occurred or is about to occur.

In one example, the display 200 or 300 can present the synthetic visualization and the system 100 can compute and provide collision warnings in real time or with small processing delays which are limited only by the speed of the processor.

Figure 4:
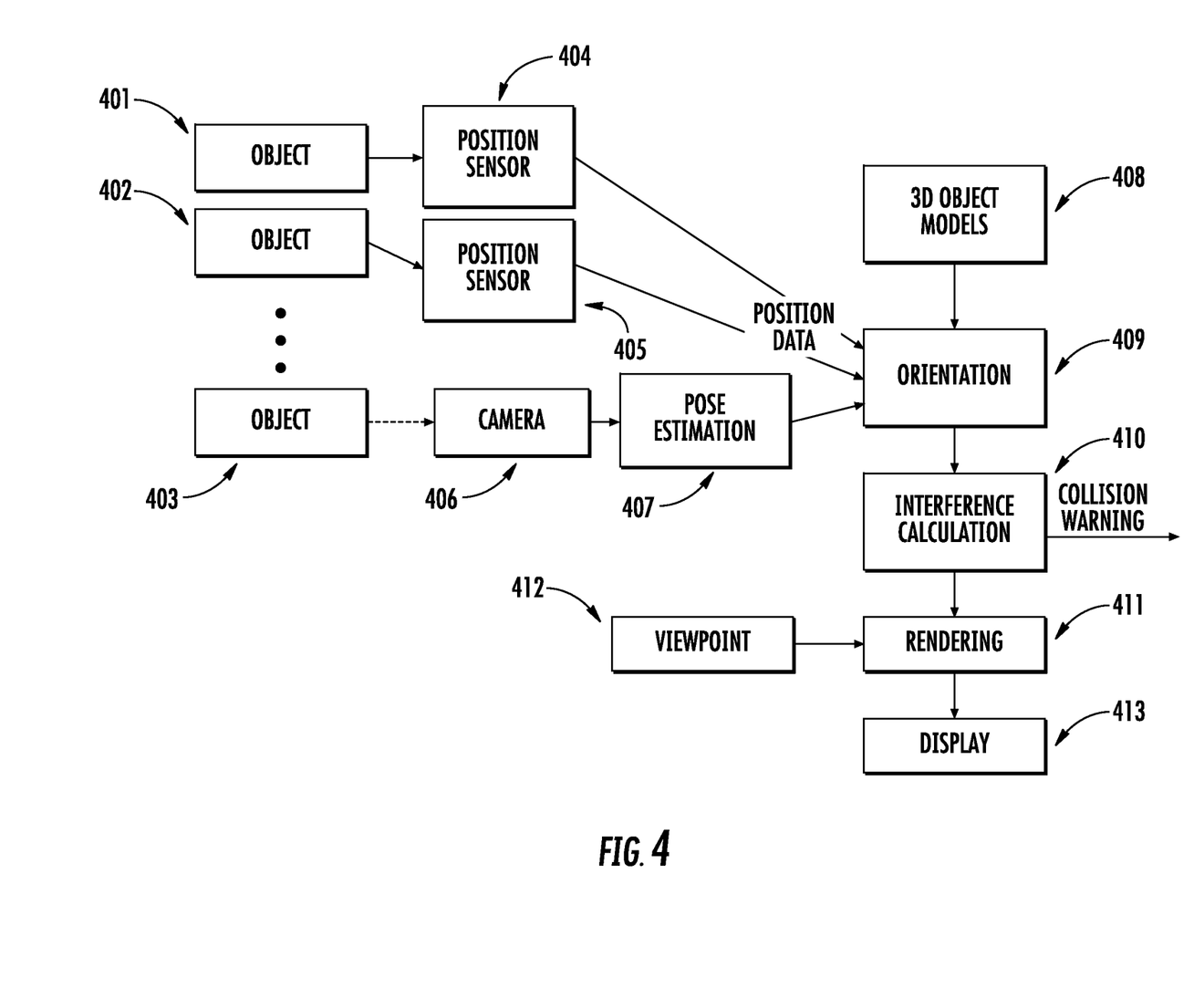
FIG. 4 illustrates an architecture of the system, according to various example implementations.

FIG. 4 illustrates an architecture 400 of the system 100, according to various example implementations. As shown, a plurality of objects, e.g., objects 401, 402 and 403, are objects that may be present in a scene. The object 401 and object 402 may have respective position sensors 404 and 405. The sensors 404 and 405 may be attached to the objects 401 and 402 and directly measure positions of the objects 401 and 402, respectively. In one example, the objects 401 and 402 may be the refueling boom 211 and the tip 212, respectively.

The object 403 may not be measured directly through a sensor. Instead, the position of the object may be measured indirectly based an image obtained by the camera 406 (corresponding to the camera 101) on the refueling aircraft. The image can be analyzed through pose estimation module 407 (corresponding to the pose estimation module 102) using pose-estimation algorithms. The pose estimation module can find the locations of feature points in the image having a known 3D relationship, and use the relationship to compute the attitude, orientation and position (pose) of the object. In one example, the object may be the receiver aircraft 201 having the receptacle 202.

In one example, the directly or indirectly measured position data of the objects 401, 402 and 403 are sent to orientation module 409 (corresponding to the orientation module 104). The orientation module can retrieve 3D models of the objects 401, 402 and 403 from the 3D object models 408 (corresponding to the 3D object models 103). The 3D object models may include 3D models of known objects that may be expected to appear in the scene. The orientation module can take measurements of positions, orientations and attitude of the objects from the position data and associate this information with the appropriate 3D models of the objects. The orientation module can determine a separation distance and respective positions of the objects based on the position data. In one example, the orientation module can enable interference calculation module 410 (corresponding to the interference calculation module 1041) to determine the spatial overlap (interference) between the objects, which may allow a collision warning or indicator to be generated.

In one example, a rendering module 411 (corresponding to the rendering module 105) can render the 3D models of the objects 401, 402 and 403 in their measured positions and orientations and create a synthetic image of the scene from an externally defined viewpoint 412. In one example, the operator can select the viewpoint arbitrarily. The synthetic image can then be presented on a display 413 (corresponding to the display 106) for human viewing. Thus, the rendering module can render a synthetic representation of the scene from an arbitrary viewpoint. The rendering module may include a rendering hardware or software. As used herein, the term module may include a hardware system and/or software module that operates to perform one or more functions. For example, the pose estimation module, orientation estimation module and rendering module may include a computer processor, controller, or other logic-based device that performs operations to accomplish the previously described functions and flowchart in FIG. 5 below, for example, based on instructions stored on a tangible and non-transitory computer readable storage medium, such as a computer memory. Alternatively, the pose estimation module, orientation estimation module, rendering module and system may include a hard-wired device that performs operations based on hard-wired logic of the device. The modules described and the flowcharts shown in the attached figures may represent the hardware that operates based on software instructions and hardware logic, the software that directs hardware to perform the operations, or a combination thereof.

In one example, the rendering module 411 may be driven by actual measured positions and orientations of the objects 401, 402 and 403 and may serve as the engine to generate the virtual scenes and collision warnings. The estimated positions and orientations of the objects can be used as input by the rendering module to provide real time updates of the synthetic scene. The estimated positions and orientations of the objects can also be used as an indicator, for example, of how close two surfaces are in space, and can be used to provide a warning when the two surfaces collide. The rendering module can provide a real time image to a human observer who may be trying to manually manipulate the objects. In one example, if the objects in the scene are not known, but are from a limited set of possibilities, an additional image processing can be performed by the system 100 to identify and discriminate between objects.

Figure 5:
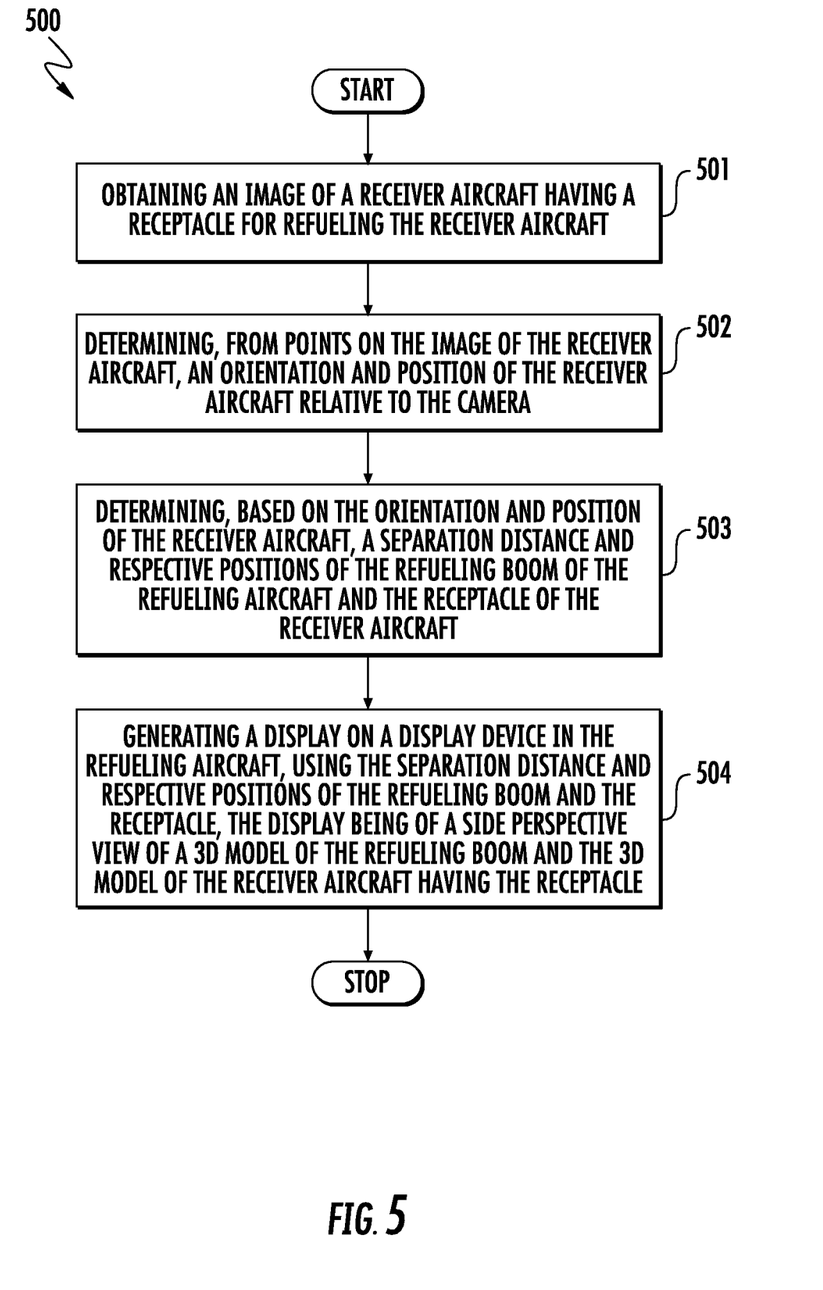
FIG. 5 is a flowchart illustrating various operations in a method of aiding maneuvering of a refueling boom of a refueling aircraft, according to various example implementations.

FIG. 5 is a flowchart illustrating various operations in a method 500 of aiding maneuvering of a refueling boom 211 of a refueling aircraft, according to various example implementations. As shown, at block 501, the method 500 includes obtaining, by the camera 101 on the refueling aircraft, an image of a receiver aircraft 201 having a receptacle 202 for refueling the receiver aircraft.

At block 502, the method 500 includes determining, from points on the image of the receiver aircraft 201, an orientation and position of the receiver aircraft relative to the camera 101 using a pose estimation algorithm and a known relationship between the points on the image of the receiver aircraft and corresponding points on a 3D model of the receiver aircraft. At block 503, the method includes determining, based on the orientation and position of the receiver aircraft, a separation distance and respective positions of the refueling boom 211 of the refueling aircraft and the receptacle 202 of the receiver aircraft.

At block 504, the method 500 includes generating a display on a display device 106 in the refueling aircraft, using the separation distance and respective positions of the refueling boom 211 and the receptacle 202, the display being of a side perspective view of a 3D model of the refueling boom and the 3D model of the receiver aircraft 201 having the receptacle, illustrating a current position of the refueling boom relative to a current position of the receptacle, from a viewpoint of a virtual camera positioned alongside the refueling boom. In some examples, the display of the side perspective view illustrating the current position of the refueling boom relative to the current position of the receptacle enables an operator on the refueling aircraft to observe and guide the refueling boom to the receptacle.

According to example implementations of the present disclosure, the refueling aircraft display subsystem 110 and its pose estimation module 102, 3D object models 103, orientation module 104, and rendering module 105 may be implemented by various means. These means may include hardware, alone or under direction of one or more computer programs from a computer-readable storage medium. In some examples, one or more apparatuses may be configured to function as or otherwise implement the refueling aircraft display subsystem 110 shown and described herein. In examples involving more than one apparatus, the respective apparatuses may be connected to or otherwise in communication with one another in a number of different manners, such as directly or indirectly via a wired or wireless network or the like.

FIG. 6 illustrates an apparatus 600 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 601 (e.g., processing circuitry) connected to a memory 602 (e.g., storage device). In some examples, the apparatus 600 implements the refueling aircraft display subsystem 110.

The processor 601 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 602 (of the same or another apparatus).

The processor 601 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 602 is generally any piece of computer hardware that is capable of storing information such as, for example, data, computer programs (e.g., computer-readable program code 603) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 602, the processor 601 may also be connected to one or more interfaces for displaying, transmitting and/or receiving information. The interfaces may include a communications interface 604 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 606 and/or one or more user input interfaces 605 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like. In some examples, the user interfaces include the GUI 106.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 600 may include a processor 601 and a computer-readable storage medium or memory 602 coupled to the processor, where the processor is configured to execute computer-readable program code 603 stored in the memory. It will also be understood that one or more functions, and combinations of functions, may be implemented by special purpose hardware-based computer systems and/or processors which perform the specified functions, or combinations of special purpose hardware and program code instructions.

Example implementations of the present disclosure may find immediate applications for aiding maneuvering of a refueling boom of a refueling aircraft, as described above. Example implementations of the present disclosure can be also applied to any situation in which a direct view of object interactions is desired but impossible to achieve. Coupled with suitable object pose estimators, example implementations of the present disclosure can be used, for example, to visualize the locations of multiple aircraft on a taxiway and to calculate their proximity to aid in collision avoidance. In another example, example implementations of the present disclosure can be used for manipulating robotic arms that need to perform tasks on satellites.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for aiding maneuvering of a refueling boom of a refueling aircraft, the system comprising:
    a camera on the refueling aircraft configured to obtain an image of a receiver aircraft having a receptacle for refueling the receiver aircraft; and
    a processor on the refueling aircraft, coupled to the camera and configured to at least:
        determine, from points on the image of the receiver aircraft, an orientation and position of the receiver aircraft relative to the camera using a pose estimation algorithm and a known relationship between the points on the image of the receiver aircraft and corresponding points on a 3D model of the receiver aircraft;
        determine, based on the orientation and position of the receiver aircraft, a separation distance and respective positions of the refueling boom of the refueling aircraft and the receptacle of the receiver aircraft; and
        generate a display on a display device in the refueling aircraft, using the separation distance and respective positions of the refueling boom and the receptacle, the display being of a side perspective view of a 3D model of the refueling boom and the 3D model of the receiver aircraft having the receptacle, illustrating a current position of the refueling boom relative to a current position of the receptacle, from a viewpoint of a virtual camera positioned alongside the refueling boom,
        wherein the display of the side perspective view illustrating the current position of the refueling boom relative to the current position of the receptacle enables an operator on the refueling aircraft to observe and guide the refueling boom to the receptacle;
        wherein the processor being configured to generate the display includes being configured to retrieve and orient positions of the 3D model of the refueling boom and the 3D model of the receiver aircraft based on the separation distance and the respective positions of the refueling boom and the receptacle.

2. The system of claim 1, wherein the processor being configured to generate the display includes being configured to overlay annotated indicia on the side perspective view indicating a point of potential collision between the refueling boom and the receiver aircraft.

3. The system of claim 1, further comprising a storage device including the 3D model of the refueling boom and the 3D model of the receiver aircraft.

4. The system of claim 1, wherein the respective positions of the refueling boom of the refueling aircraft include a position of the refueling boom, and the processor being configured to determine the separation distance and the respective positions includes being configured to determine the position of the refueling boom using one or more sensors on the refueling boom.

5. The system of claim 1, wherein the display of the side perspective view enables the operator on the refueling aircraft to observe and guide a tip of the refueling boom to the receptacle.

6. A method of aiding maneuvering of a refueling boom of a refueling aircraft, the method comprising:
obtaining, by a camera on the refueling aircraft, an image of a receiver aircraft having a receptacle for refueling the receiver aircraft; and by a processor on the refueling aircraft;
determining, from points on the image of the receiver aircraft, an a six-dimensional orientation and position of the receiver aircraft relative to the camera using a pose estimation algorithm and a known relationship between the points on the image of the receiver aircraft and corresponding points on a 3D model of the receiver aircraft;
determining, based on the orientation and position of the receiver aircraft, a separation distance and respective positions of the refueling boom of the refueling aircraft and the receptacle of the receiver aircraft; and
generating a display on a display device in the refueling aircraft, using the separation distance and respective positions of the refueling boom and the receptacle, the display being of a side perspective view of a 3D model of the refueling boom and the 3D model of the receiver aircraft having the receptacle, illustrating a current position of the refueling boom relative to a current position of the receptacle, from a viewpoint of a virtual camera positioned alongside the refueling boom,
wherein the display of the side perspective view illustrating the current position of the refueling boom relative to the current position of the receptacle enables an operator on the refueling aircraft to observe and guide the refueling boom to the receptacle;
wherein generating the display includes retrieving and orienting positions of the 3D model of the refueling boom and the 3D model of the receiver aircraft based on the separation distance and the respective positions of the refueling boom and the receptacle.

7. The method of claim 6, wherein generating the display includes overlaying annotated indicia on the side perspective view indicating a point of potential collision between the refueling boom and the receiver aircraft.

8. The method of claim 6, further comprising retrieving the 3D model of the refueling boom and the 3D model of the receiver aircraft from a storage device.

9. The method of claim 6, wherein the respective positions of the refueling boom of the refueling aircraft include a position of the refueling boom, and wherein determining the separation distance and the respective positions includes determining the position of the refueling boom using one or more sensors on the refueling boom.

10. The method of claim 6, wherein the display of the side perspective view enables the operator on the refueling aircraft to observe and guide a tip of the refueling boom to the receptacle.

11. A computer-readable storage medium for aiding maneuvering of a refueling boom of a refueling aircraft, the computer-readable storage medium being non-transitory and having computer-readable program code stored therein that in response to execution by a processor, causes a computer system to at least:
obtain an image of a receiver aircraft having a receptacle for refueling the receiver aircraft from a camera on the refueling aircraft;
determine, from points on the image of the receiver aircraft, an orientation and position of the receiver aircraft relative to the camera using a pose estimation algorithm and a known relationship between the points on the image of the receiver aircraft and corresponding points on a 3D model of the receiver aircraft;
determine, based on the orientation and position of the receiver aircraft, a separation distance and respective positions of the refueling boom of the refueling aircraft and the receptacle of the receiver aircraft; and
generate a display on a display device in the refueling aircraft, using the separation distance and respective positions of the refueling boom and the receptacle, the display being of a side perspective view of a 3D model of the refueling boom and the 3D model of the receiver aircraft having the receptacle, illustrating a current position of the refueling boom relative to a current position of the receptacle, from a viewpoint of a virtual camera positioned alongside the refueling boom,
wherein the display of the side perspective view illustrating the current position of the refueling boom relative to the current position of the receptacle enables an operator on the refueling aircraft to observe and guide the refueling boom to the receptacle;
wherein the computer system being caused to generate the display includes being caused to retrieve and orient positions of the 3D model of the refueling boom and the 3D model of the receiver aircraft based on the separation distance and the respective positions of the refueling boom and the receptacle.

12. The computer-readable storage medium of claim 11, wherein the computer system being caused to generate the display includes being caused to overlay annotated indicia on the side perspective view indicating a point of potential collision between the refueling boom and the receiver aircraft.

13. The computer-readable storage medium of claim 11, wherein the computer system being further caused to retrieve the 3D model of the refueling boom and the 3D model of the receiver aircraft from a storage device.

14. The computer-readable storage medium of claim 11, wherein the respective positions of the refueling boom of the refueling aircraft include a position of the refueling boom, and the computer system being caused to determine the separation distance and the respective positions includes being caused to determine the position of the refueling boom using one or more sensors on the refueling boom.

15. The computer-readable storage medium of claim 11, wherein the display of the side perspective view enables the operator on the refueling aircraft to observe and guide a tip of the refueling boom to the receptacle.

16. The system of claim 1, wherein the processor configured to determine the orientation and the position of the receiver aircraft includes the processor configured to use the pose estimation algorithm to generate a six-dimensional pose of the receiver aircraft based on the points on the image of the receiver aircraft.

17. The method of claim 6, wherein determining the orientation and position of the receiver aircraft includes using the pose estimation algorithm to generate a six-dimensional pose of the receiver aircraft based on the points on the image of the receiver aircraft.

* * * * *